(12) United States Patent
Buttrick et al.

(10) Patent No.: US 6,467,385 B1
(45) Date of Patent: Oct. 22, 2002

(54) PANEL TRIMMING SYSTEM

(75) Inventors: James N. Buttrick, Seattle, WA (US); Alan Ray Merkley, Greenbank, WA (US); Philip Marten Wright, Clinton, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/454,388

(22) Filed: Dec. 3, 1999

(51) Int. Cl.$^7$ .............................. B27B 5/00; B27B 9/04; B21D 53/00; B23P 6/00; B26D 5/08
(52) U.S. Cl. ..................... 83/745; 83/471.2; 83/489; 83/823; 83/56; 83/701; 83/100; 30/372; 29/897.2; 29/897.312
(58) Field of Search ................. 83/745, 471.2, 83/485, 489, 821, 100, 823, 744, 743, 56, 52, 701; 30/370, 372; 29/897.2, 897.32, 897.312, 890.031, 402.09, 402.11, 407.16

(56) References Cited

U.S. PATENT DOCUMENTS

| | | | | |
|---|---|---|---|---|
| 2,921,492 A | * | 1/1960 | Worth ....................... 83/471.2 |
| 3,011,530 A | * | 12/1961 | Lamb .......................... 83/745 |
| 3,434,514 A | * | 3/1969 | McManama ................. 83/745 |
| 3,842,700 A | * | 10/1974 | Novak .......................... 83/468 |
| 4,050,340 A | * | 9/1977 | Flanders ................... 83/522.25 |
| 4,135,419 A | * | 1/1979 | Chapin ....................... 83/471.3 |
| 4,281,694 A | * | 8/1981 | Gorman ................. 144/136.95 |
| 4,397,089 A | | 8/1983 | Pease |
| 4,633,555 A | | 1/1987 | Legge |
| 4,761,884 A | | 8/1988 | Nguyen et al. |
| 4,830,551 A | * | 5/1989 | Brennan et al. .......... 83/745 X |
| 4,872,249 A | * | 10/1989 | VanderPol et al. ......... 29/157.4 |
| 5,403,133 A | * | 4/1995 | Kim ............................. 408/78 |
| 5,437,103 A | * | 8/1995 | Baptiste ....................... 30/372 |
| 5,598,760 A | * | 2/1997 | Sucic et al. ................ 29/889.6 |
| 5,678,314 A | | 10/1997 | Braunbach et al. |
| 5,740,847 A | * | 4/1998 | Lasko ..................... 144/144.1 |
| 5,848,930 A | * | 12/1998 | Jones .......................... 384/12 |

* cited by examiner

Primary Examiner—Boyer D. Ashley
(74) Attorney, Agent, or Firm—Christensen O'Connor Johnson Kindness PLLC

(57) ABSTRACT

One side of an access panel is trimmed while an opposite side of the panel is secured in an opening between skin sheets on the underside of an aircraft wing. The trimming apparatus includes a frame secured to one of the skin sheets with a rail extending along an edge of the opening and a trim saw assembly slideable along the rail. The frame can be secured in position by several vacuum cups, and can include index flanges engageable against an edge of the opening for precise positioning of the rail and the trim saw assembly carried thereby.

11 Claims, 4 Drawing Sheets

PANEL TRIMMING SYSTEM

FIELD OF THE INVENTION

The present invention relates to a system for trimming a panel to fit closely in an opening.

BACKGROUND OF THE INVENTION

Some modern commercial aircraft have access panels in the underside of a wing. Such panels may be cut to fit and then installed in an opening after the wing skin sheets have been installed. One application of the present invention is in trimming such access panels for a close fit in the opening. A previously known method for trimming such a panel is to measure the opening and trim the panel accordingly. Another known method is to place one edge of the panel against the adjacent skin sheet, affix the panel in the opening along that edge, mark the other edge in the area to be trimmed, scribe the desired line of the cut, detach the panel, trim the panel along the scribe marking, and remount the panel in the opening.

SUMMARY OF THE INVENTION

The present invention provides a system for trimming a panel to fit closely in an opening. In the preferred embodiment, one side of the panel is trimmed while an opposite side is secured. The system includes a frame with a rail along which a carriage for a trim saw is moveable. The frame and rail can be secured adjacent to the opening by vacuum cups carried by the frame. Index flanges engage in the opening to position the rail adjacent to the panel edge to be trimmed. The position of the trim saw is adjustable relative to the rail to assure that the panel is trimmed precisely to fit within the opening when the frame is detached.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings wherein.

DETAILED DESCRIPTION OF THE PREFERRED EMBODIMENT

Figure 1:
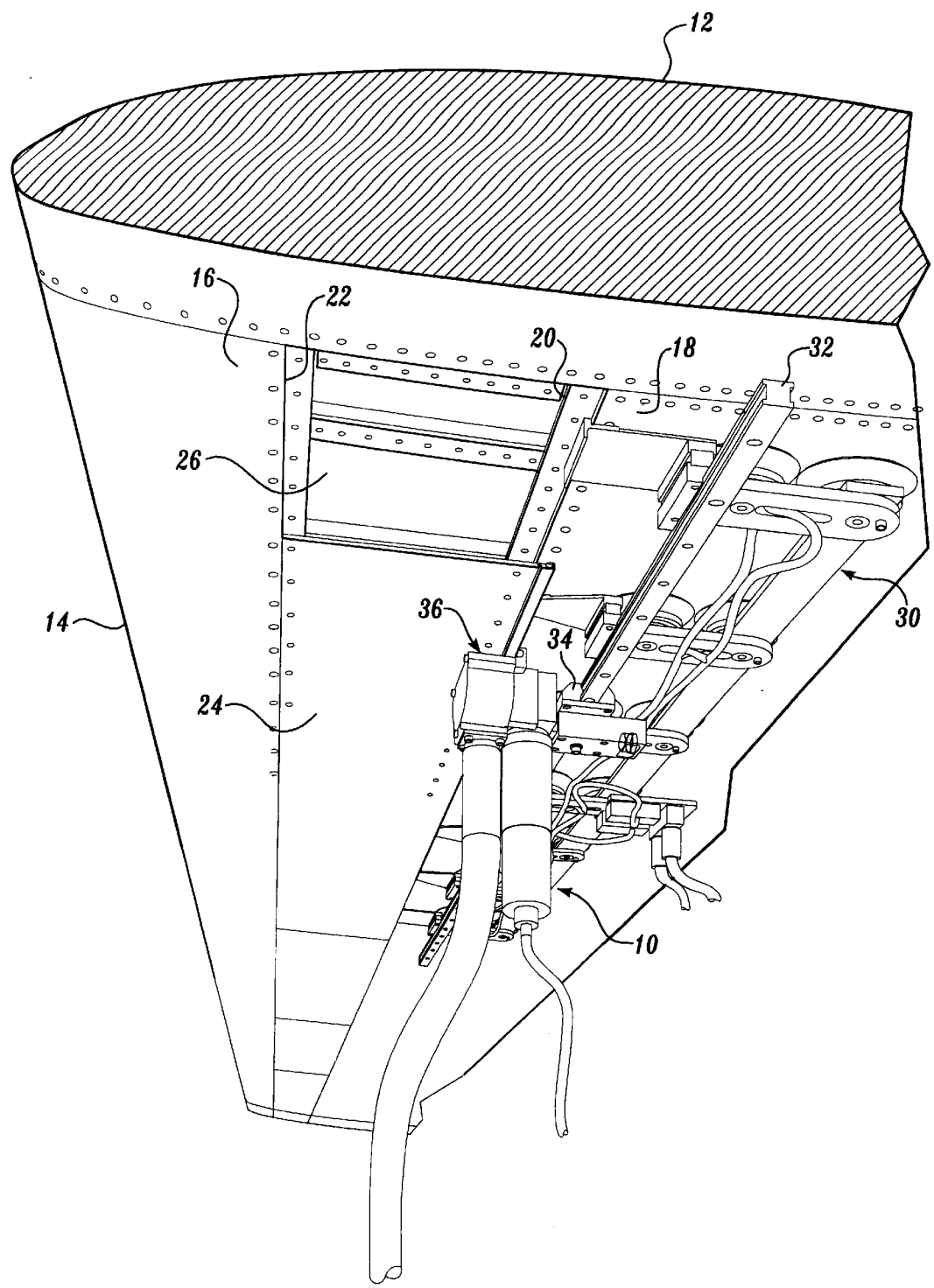
FIG. 1 is a somewhat diagrammatic bottom perspective of an airplane wing and a panel trimming system in accordance with the present invention.

FIG. 1 illustrates the environment for one application of a panel trimming system 10 in accordance with the present invention which trims a panel to fit in an opening of a structure. An aircraft wing 12 has a leading edge 14 including one or more skin sheets 16 that terminate at a straight, spanwise extending trailing edge 22 underneath the wing. Moving aftward, the central and aft portions of the wing have one or more skin sheets 18 with leading edges 20 spaced aft of the trailing edge 22 of the skin sheet 16. Access panels 24 are mounted in the opening 26 formed between edges 20 and 22. With a panel removed, the opening 26 provides access to the interior of the wing during aircraft manufacture. Preferably the panels are detachable thereafter, such as for maintenance of components inside the wing.

For aerodynamic efficiency, it is desirable that the access panels 24 fit closely in the opening 26. Typically one edge of the access panel, usually the leading edge, can be butted against the edge of the adjacent skin sheet. Manufacturing tolerances are sufficiently great that the panel cannot be pretrimmed for a desired close fit. Rather, after the skin sheets 16 and 18 have been installed, panels 24 are trimmed to fit within the opening 26. Still, if too large a gap exists between adjacent edges of the trim panel and skin sheets, filler must be installed.

In general, the trimming system 10 in accordance with the present invention uses a frame 30 secured underneath the wing adjacent to an edge of the opening 26. Frame 30 carries a rail 32 for a carriage 34 on which a trim saw assembly 36 is mounted. The rail is positioned such that the trim saw cuts a margin of a panel 24 which has had the opposite margin secured within the opening. Such trimming occurs as the carriage is moved along the rail. After the trimming operation is completed, the frame can be detached and repositioned for trimming the next panel. Ultimately, the trimmed edge is secured by fasteners and the exposed underside of the panel forms a smooth continuation of the wing skin.

Figure 2:
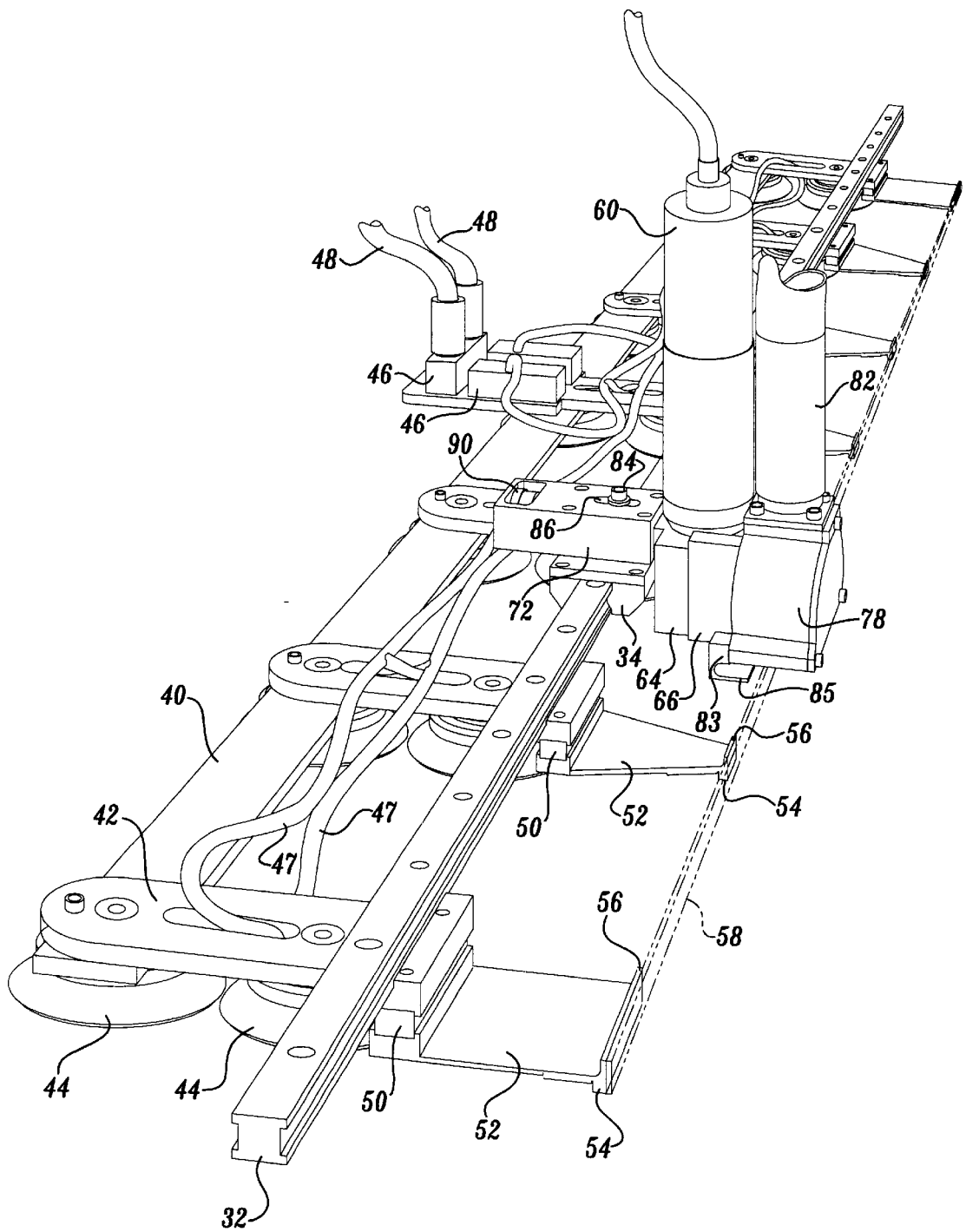
FIG. 2 is a slightly enlarged bottom perspective of panel trimming components of the system of FIG. 1.
Figure 3:
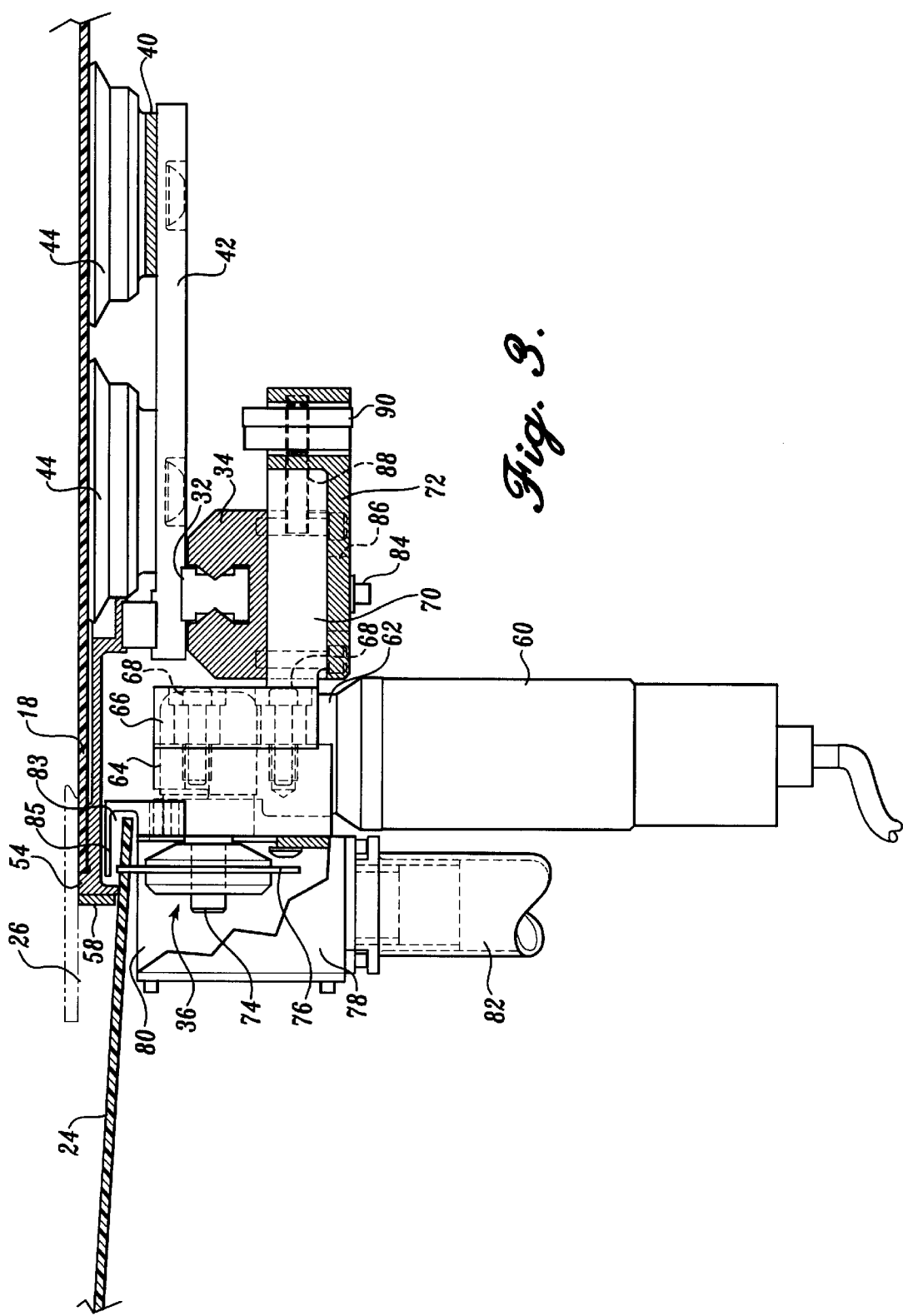
FIG. 3 is a somewhat diagrammatic end elevation of components of the panel trimming system of FIG. 1 with parts broken away and parts shown in section.
Figure 4:
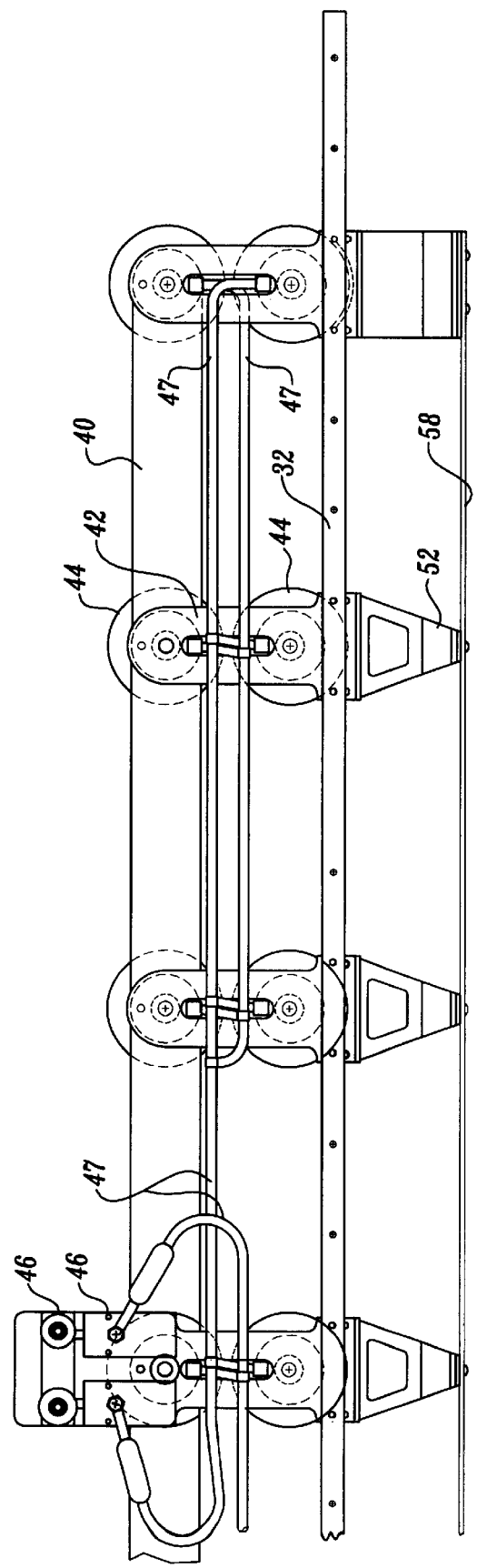
FIG. 4 is a fragmentary top plan of components of a panel trimming system in accordance with the present invention.

More specifically, with reference to FIG. 2, FIG. 3 and FIG. 4, the frame 30 includes a rear longitudinal structural bar 40 and cross-pieces 42 secured to and extending transversely from the bar. The last structural component of the frame is the front rail 32 secured to the end portions of the cross-members 42 opposite their connection to the rear bar 40.

For attaching the frame to the underside of the wing, preferably resilient vacuum cups 44 are mounted on the cross-pieces 42. The cups extend from the cross-pieces oppositely from the rail 32, i.e., the cups are at the top of the frame and the rail hangs from the bottom in the operational configuration. Vacuum generators 46 are mounted on the center cross-piece 42 and are operably connected to the vacuum cups 44 by hoses 47. The vacuum generators are driven by air under pressure (shop air) supplied through hoses 48.

With reference to FIG. 2, a spacer block 50 is secured to each cross-piece 42, at the opposite side of the rail 32. The spacer blocks carry index plates 52 which project generally transversely of the length of rail 32, generally away from the vacuum cups. The index plates have upward projecting index tabs or flanges 54 and downward extending panel skid flanges 56. Preferably the panel skids 56 are connected by a long, rail-like skid bar 58, shown in broken lines in FIG. 2.

The mounting of the trim saw assembly 36 to the carriage 34 is best seen in FIG. 3. A pneumatic motor 60 has a cylindrical head portion 62 clamped between front and rear mounting blocks 64 and 66 by bolts 68. Mounting block 66 has a transverse tongue 70 offset from the bolts and received in a central channel of an adjustment block 72. Block 72 is, in turn, secured to the carriage 34. The output shaft 74 of the motor carries the trim saw blade 76. A dust collector assembly 78 substantially encloses the sawblade 76 but is open at the top 80 through which the blade 76 projects. A vacuum hose 82 communicates with the interior of the dust collector assembly 78 for removal of particles resulting from the trimming operation. A blade guard 83 is mounted on the top of the front mounting block 64 and includes a tongue 85 spaced above the blade 76.

Vertical adjustment of the trim- saw can be achieved by loosening the bolts 68, shifting the motor and saw assembly up or down, and retightening the bolts. Transverse adjustment of the position of the trim saw, i.e., in a direction axially of the output shaft 74, is by sliding the tongue 70 in the corresponding passage of the adjustment block 72. This can be achieved by loosening a clamp bolt 84, the shank of which passes through an elongated slot 86 best seen in FIG. 2. For reliable fine adjustment in the horizontal direction, an adjustment bolt 88 is threaded into a bore in the end of the tongue 70 remote from the motor 60. The adjustment bolt 88 can be rotated by an enlarged head or knob 90. Thus, with the clamp bolt 84 released, knob 90 can be turned to slide the tongue 70 in the corresponding passage of the mounting block 72 and shift the entire motor and blade assembly.

With reference to FIG. 1, operation of the panel trimming system in accordance with the present invention is as follows: a panel 24 to be trimmed is mounted in the opening 26 with one edge tightly abutted against the adjacent edge of the skin sheet. Typically this will be the leading edge of the access panel against the trailing edge 22 of the skin sheet 16, such edge of the access panel being secured in the desired abutting relationship by multiple removeable fasteners. With reference to FIG. 3, the frame 30 is positioned adjacent to the opposite edge with the index flanges 54 engaged tightly against the edge of the other skin sheet. Typically this will be the leading edge 20 of skin sheet 18. While the frame is held in position, the vacuum generators are activated so that the vacuum cups 44 hold the frame reliably in position. The edge of the access panel 24 to be trimmed, typically the trailing edge, rides along the skids 56, 58 which are closely adjacent to the trim saw blade 76 (the resiliency of panel 24 biases the trailing edge upward). The position of the blade 76 is fixed relative to the frame 30 including the index flanges 54 which are engaged against the edge 20 to which it is desired to mate the trimmed edge of the panel. A very close fit of the trimmed panel edge against the adjacent edge 20 of the skin sheet 18 can be achieved, without marking the panel or detaching it from the wing. When an entire panel has been trimmed, the frame can be moved to the next panel or removed entirely from the underside of the wing, and the trailing edge of the access panel 24 secured in position by removeable fasteners.

While the preferred embodiment of the invention has been illustrated and described, it will be appreciated that various changes can be made therein without departing from the spirit and scope of the invention.

What is claimed is:

1. A combination, the combination comprising:
   a structure having an opening, the opening having first and second edges disposed opposite each other;
   a panel having a first side secured adjacent to the first edge of the opening and a second side opposite the first side; and
   an apparatus for trimming the panel, said apparatus comprising
      a frame including a vacuum cup mounting the frame adjacent to the second edge of the opening, the frame having an elongated rail extending generally parallel to the second edge of the opening, the frame including an index flange in predetermined position relative to the rail and engaged against the second edge of the opening, and a trim saw assembly moveable along the rail to trim the second side of the panel so that the panel fits closely in the opening.

2. The combination defined in claim 1, in which the structure has an underside, the opening extending along the underside of the structure, the frame being mounted to the underside of the structure adjacent to the opening.

3. The combination defined in claim 1, in which the trim saw assembly includes a skid portion adjacent to the index flange and supporting the second side of the panel as it is trimmed.

4. A combination, the combination comprising:
   an aircraft wing having an underside including an opening, the opening having first and second spanwise extending edges disposed opposite each other,
   an access panel having a first side secured adjacent to the first edge of the opening and a second side opposite the first side;
   a frame mounted adjacent to the second edge of the opening, the frame having an elongated rail extending generally parallel to the second edge of the opening, the frame including an index flange in predetermined position relative to the rail, the index flange being in engagement against the second edge of the opening and positioning the rail relative to the second edge; and
   a trim saw assembly moveable along the rail to trim the second side of the access panel to fit closely in the opening in the underside of the wing.

5. The combination defined in claim 4, in which the opening is formed between skin sheets on the underside of the wing, the frame including a plurality of vacuum cups mounting the frame to a skin sheet adjacent to the second edge of the opening.

6. The combination defined in claim 4, in which the trim saw assembly includes a skid portion adjacent to the index flange, the second side of the access panel resting against the skid portion as the trim saw is moved along the rail.

7. The combination defined in claim 4, in which the frame includes an elongated structural member extending parallel to but spaced from the rail, and a plurality of cross pieces secured to the structural member and the rail.

8. The combination defined in claim 7, including a plurality of vacuum cups secured to the cross members and mounting the frame to a skin sheet adjacent to the second edge of of the opening.

9. The combination defined in claim 4, in which the position of the trim saw assembly is adjustable transversely of the length of the rail.

10. The combination defined in claim 9, in which the frame and trim saw assembly include cooperating adjustment components slideable relative to each other in a direction transversely of the rail, the components being lockable in fixed position relative to each other but being unlockable for relative movement of such components.

11. The combination defined in claim 10, including an adjustment bolt threaded into one of the cooperating components and, with the components unlocked, turnable for precise fine adjustment of the trim saw assembly in a direction transversely of the length of tie rail.

* * * * *

UNITED STATES PATENT AND TRADEMARK OFFICE
CERTIFICATE OF CORRECTION

PATENT NO. : 6,467,385 B1  
DATED : October 22, 2002  
INVENTOR(S) : J.N. Buttrick et al.

It is certified that error appears in the above-identified patent and that said Letters Patent is hereby corrected as shown below:

Column 4,
Line 60, "tie" should read -- the --

Signed and Sealed this

Twenty-fifth Day of March, 2003

JAMES E. ROGAN
*Director of the United States Patent and Trademark Office*